US 6,656,008 B2

(12) United States Patent
Oh et al.

(10) Patent No.: US 6,656,008 B2
(45) Date of Patent: Dec. 2, 2003

(54) DEVICE FOR FORMING PARTITION WALLS OF PLASMA DISPLAY PANEL

(75) Inventors: Sang Jin Oh, Pyungtaek-si (KR); Bong Hyang Kim, Osan-si (KR); Deok Hwan Kim, Pyungtaek-si (KR); Soon Kug Hong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 09/729,965

(22) Filed: Dec. 6, 2000

(65) Prior Publication Data

US 2001/0004576 A1 Jun. 21, 2001

(30) Foreign Application Priority Data

Dec. 16, 1999 (KR) ........................... 1999-58330

(51) Int. Cl.[7] .................. H01J 9/46; H01J 9/06
(52) U.S. Cl. .................. 445/66; 445/67; 445/60; 313/582
(58) Field of Search .................. 445/66, 67, 60, 445/24, 25; 264/320, 319; 313/582

(56) References Cited

U.S. PATENT DOCUMENTS 5,992,320 A * 11/1999 Kosaka et al. ........... 101/401.1
6,039,619 A * 3/2000 Kang et al. .................. 445/24
6,482,062 B1 * 11/2002 Yao et al. .................... 445/24

FOREIGN PATENT DOCUMENTS

JP 2001229812 A * 8/2001 ............ H01J/9/02
WO WO 9827571 A1 * 6/1998 ............ H01J/11/02

* cited by examiner

Primary Examiner—Kenneth J. Ramsey
Assistant Examiner—German Colón
(74) Attorney, Agent, or Firm—Birch, Stewart, Kolasch & Birch, LLP

(57) ABSTRACT

A device for forming partition walls of a plasma display panel is disclosed. This device has a lower plate used for seating the base panel of the plasma display panel thereon, with a partition wall sheet of a predetermined thickness formed on the base panel and a plurality of electrodes arranged on the base panel. A punch, having a plurality of partition wall forming grooves and a plurality of lands formed between the partition wall forming grooves. An electrode holding groove or inclined surface is formed on each of the lands and is used for preventing the electrodes from being undesirably moved during a partition wall forming process. An upper plate is positioned above the punch so as to hold the punch and to move the punch in a vertical direction within a predetermined range. Due to the electrode holding grooves or the inclined surfaces formed on the lands, the device of this invention thus almost completely prevents an undesired movement of the printed address electrodes of the base panel, thus finally allowing a precise arrangement of the partition walls with the address electrodes on the base panel.

9 Claims, 6 Drawing Sheets

DEVICE FOR FORMING PARTITION WALLS OF PLASMA DISPLAY PANEL

BACKGROUND OF THE INVENTION

1. Field of the Invention

The present invention relates to a device for producing plasma display panels and, more particularly, to a device for forming the partition walls on the base panel of such a plasma display panel, the device being designed to prevent an undesired movement of printed address electrodes of the base panel during a process of forming the partition walls on said base panel, thus finally allowing a precise arrangement of the partition walls with the address electrodes on the base panel.

2. Description of the Prior Art

FIG. 1 is a view, showing the construction of a conventional device for forming the partition walls on the base panel of a plasma display panel (PDP). As shown in the drawing, the conventional partition wall forming device comprises a lower plate 102, a plate punch 112, and an upper plate 114. During a process of forming desired partition walls on the base panel 104 of a PDP, the lower plate 102 seats the base panel 104 thereon, with a partition wall sheet 106 of a predetermined thickness being laid on the panel 104 and a plurality of regularly spaced electrodes 108 arranged on the partition wall sheet 106. The plate punch 112, having a plurality of partition wall forming grooves 110, is positioned above the partition wall sheet 106. The upper plate 114 holds the top surface of the plate punch 112, and moves the punch 112 in a vertical direction. In the conventional partition wall forming device, the lower plate 102 is held by a lower support 116, while the upper plate 114 is held by an upper support 118.

A plurality of heaters 120 and 124 are set within both the plate punch 112 and the lower plate 102. Therefore, the plate punch 112 and the lower plate 102 are heated to predetermined temperatures by the heaters 120 and 124, thus easily forming desired partition walls on the base panel 104 when compressing the partition wall sheet 106 by the plate punch 112 and the lower plate 102. In the drawing, the reference numeral 105 denotes a dielectric layer coated on the partition wall sheet 106 while completely covering the electrodes 108.

The conventional partition wall forming device is operated as follows:

FIG. 2 is a sectional view of the base panel of a PDP having the partition walls formed by the conventional forming device of FIG. 1.

In an operation of the partition wall forming device, the upper plate 114 actuates the plate punch 112, thus moving the punch 112 downward to a predetermined height in a vertical direction so as to allow the punch 112 to press the top surface of the partition wall sheet 106 down. Therefore, a plurality of regularly spaced partition walls 130, having a shape corresponding to the partition wall forming grooves 110 of the punch 112, are formed on the sheet 106 of the base panel 104.

However, the conventional partition wall forming device is problematic as follows: That is, when the plate punch 112 presses the top surface of the partition wall sheet 106 of the base panel 104 down to form the partition walls 130 on the sheet 106 as described above, the printed electrodes 108 positioned at the area around the edge of the base panel 104 are undesirably moved to the side of the partition walls 130. Therefore, the electrodes 108 may fail to be precisely arranged with the partition walls 130, thus failing to produce a desired PDP.

In addition, the flow characteristics of the partition wall sheet 106 are different from those of the printed electrodes 108 due to both heat of the heaters 120 and 124 and punching pressure during the process of forming the partition walls 130 on the base panel 104. Therefore, it is very difficult to control such an undesired movement of the electrodes 108 within the partition wall sheet 106.

SUMMARY OF THE INVENTION

Accordingly, the present invention has been made keeping in mind the above problems occurring in the prior art, and an object of the present invention is to provide a device for forming the partition walls on the base panel of a PDP, which is designed to prevent an undesired movement of the printed address electrodes of the base panel during a process of forming the partition walls on the base panel, thus finally allowing a precise arrangement of the partition walls with the address electrodes on the base panel.

In order to accomplish the above object, the present invention provides a device for forming partition walls of a plasma display panel, comprising: a lower plate used for seating the base panel of the plasma display panel thereon during a partition wall forming process, with a partition wall sheet of a predetermined thickness formed on the base panel and a plurality of electrodes arranged on the base panel; a punch provided with a plurality of partition wall forming grooves having a shape corresponding to that of the partition walls to be formed on the base panel, with a plurality of lands formed between the partition wall forming grooves and used for pressing the partition wall sheet during the partition wall forming process, and an electrode holding means formed on each of the lands and used for preventing the electrodes from being undesirably moved during the process; and an upper plate positioned above the punch so as to hold the punch and to move the punch in a vertical direction within a predetermined range.

In another embodiment, the present invention provides a device for forming partition walls of a plasma display panel by pressing a partition wall sheet of a predetermined thickness, formed on the base panel of the plasma display panel, using a punch, wherein the punch is a roll punch having a predetermined diameter with a rotating shaft mounted to the central axis of the roll punch, the roll punch also having a plurality of partition wall forming grooves, with a plurality of lands formed between the partition wall forming grooves and used for pressing the partition wall sheet during a partition wall forming process, and an electrode holding means formed on each of the lands and used for holding printed electrodes of the partition wall sheet so as to prevent the electrodes from being undesirably moved during the partition wall forming process.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
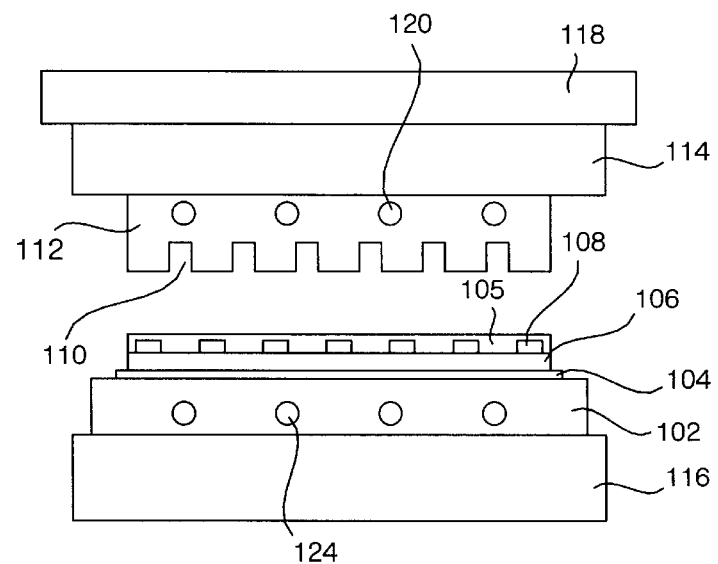
FIG. 1 is a view, showing the construction of a conventional device for forming the partition walls on the base panel of a PDP.
Figure 2:
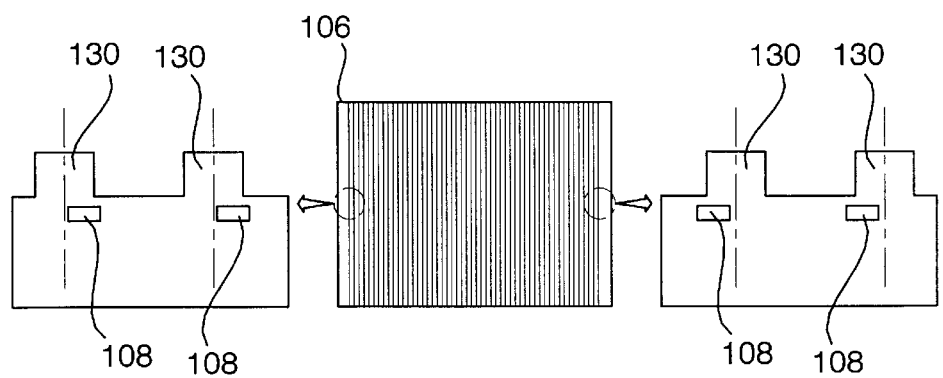
FIG. 2 is a sectional view of the base panel of a PDP having the partition walls formed by the conventional forming device of FIG. 1.
Figure 3:
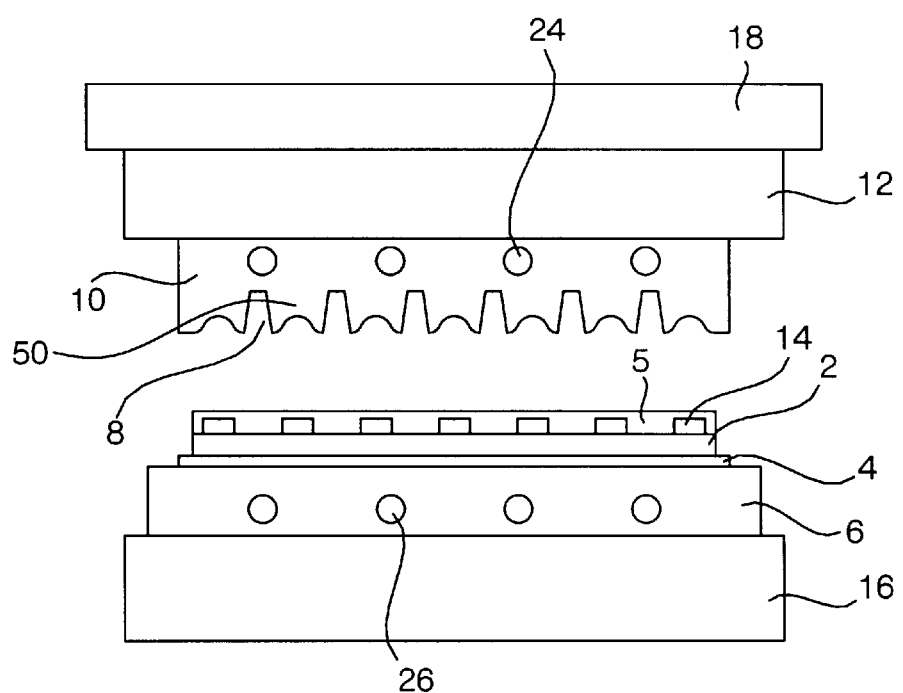
FIG. 3 is a view, showing a device for forming the partition walls on the base panel of a PDP in accordance with the primary embodiment of the present invention.

FIG. 3 is a view, showing a device for forming the partition walls on the base panel of a PDP in accordance with the primary embodiment of this invention.

As shown in the drawing, the partition wall forming device according to the primary embodiment of this invention comprises a lower plate 6, a plate punch 10, and an upper plate 12. During a process of forming desired partition walls on the base panel 4 of a PDP, the lower plate 6 seats the base panel 4 thereon, with a partition wall sheet 2 of a predetermined thickness being laid on the panel 4 and a plurality of regularly spaced electrodes 14 arranged on the partition wall sheet 2. The plate punch 10, having a plurality of partition wall forming grooves 8, is positioned above the partition wall sheet 2, and presses the sheet 2 down to form desired partition walls on the base panel 4 using the forming grooves 8. The upper plate 12 holds the top surface of the plate punch 10, and moves the punch 10 in a vertical direction. A plurality of depressed lands 50 are formed between the grooves 8 of the plate punch 10, and are individually provided with an electrode holding means for preventing the electrodes 14 from being undesirably moved during a partition wall forming process.

The electrodes 14 are regularly formed on the partition wall sheet 2 prior to coating a dielectric layer 5 on the partition wall sheet 2 while completely covering the electrodes 14. In the partition wall forming device of this invention, the lower plate 6 is held by a lower support 16 positioned under the plate 6, while the upper plate 12 is held by an upper support 18 positioned on the plate 12.

A plurality of heaters 24 and 26 are set within both the plate punch 10 and the lower plate 6. Therefore, the plate punch 10 and the lower plate 6 are heated to predetermined temperatures by the heaters 24 and 26, thus easily forming desired partition walls on the base panel 4 when compressing the partition wall sheet 2 between the plate punch 10 and the lower plate 6.

The partition wall forming grooves 8, having a shape corresponding to that of desired partition walls 30 of the base panel 4, are formed on the lower surface of the plate punch 10. The depressed lands 50 are formed between the forming grooves 8 of the plate punch 10, and depress the top surface of the partition wall sheet 2 down during a partition wall forming process.

Figure 4:
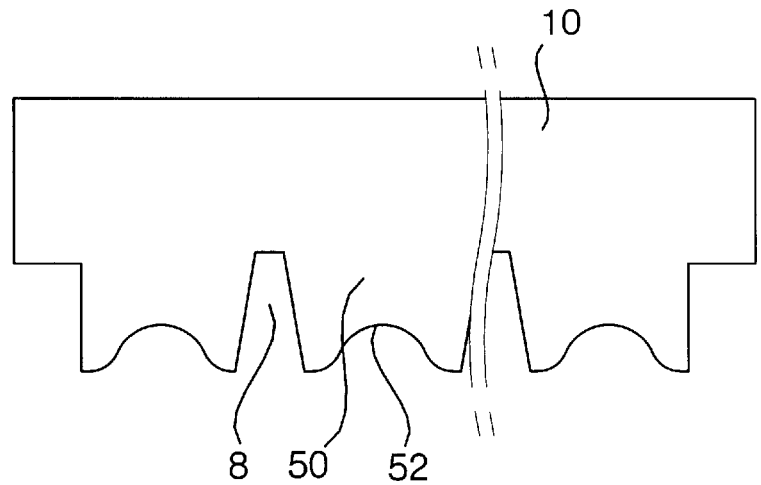
FIG. 4 is an enlarged sectional view of the forming device of FIG. 3.
Figure 5:
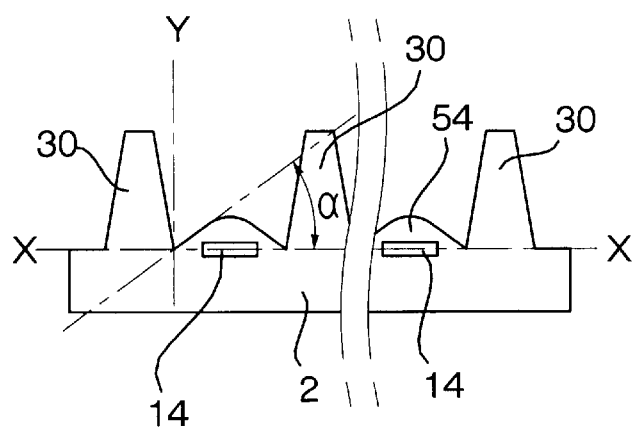
FIG. 5 is a sectional view of the base panel of a PDP having the partition walls formed by the forming device of FIG. 4.

Each of the lands 50 is provided with an electrode holding means for preventing the electrodes 14 from being undesirably moved during a partition wall forming process. As best seen in FIG. 4, the electrode holding means comprises a longitudinal rounded groove 52 concaved along the lower surface of each land 50. When the plate punch 10 presses the partition wall sheet 2 down, the electrode holding grooves 52 form a plurality of convex bottoms 54 having a predetermined convex angle between the resulting partition walls 30 of the partition wall sheet 2 as shown in FIG. 5. That is, the electrode holding grooves 52 almost completely prevent the printed electrodes 14 of the partition wall sheet 2 from being undesirably moved to the left or right during a partition wall forming process.

In the primary embodiment of the present invention, it is preferable to set the convex angle "α" of each convex bottom 54 relative to a horizontal axis "X" parallel to the horizontal surface of the partition wall sheet 2 to 90° or less.

Figure 6:
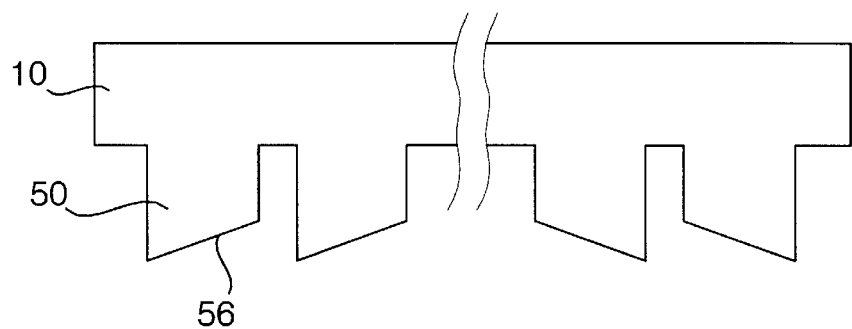
FIG. 6 is an enlarged sectional view of a partition wall forming device having an electrode holding means in accordance with the second embodiment of the present invention.

FIG. 6 is a sectional view of a partition wall forming device having an electrode holding means in accordance with the second embodiment of the present invention. As shown in the drawing, the electrode holding means according to the second embodiment comprises an linearly inclined surface 56, which is formed on the lower surface of each land 50 to have a predetermined angle of inclination. The electrode holding surfaces 56 of the lands 50 are linearly inclined upwardly in a direction from the opposite sides to the central portion of the punch 10.

Figure 7:
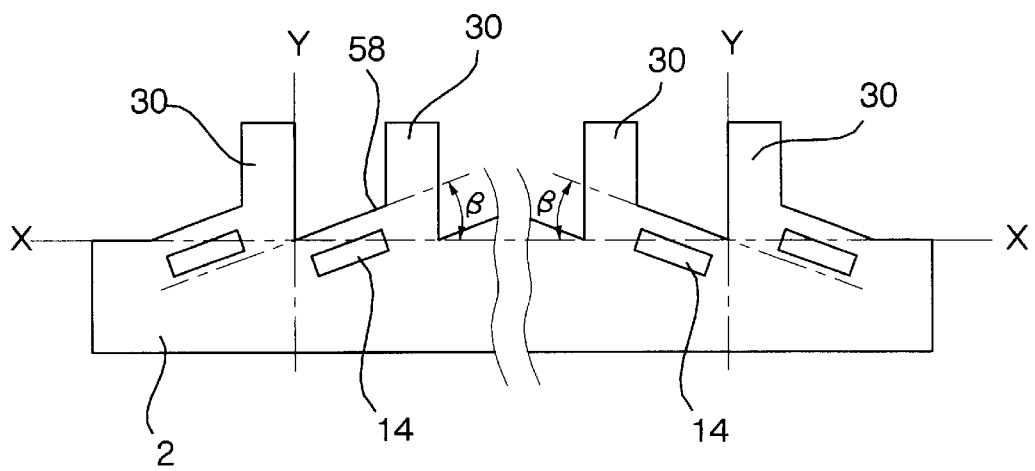
FIG. 7 is a sectional view of the base panel of a PDP having the partition walls formed by the forming device of FIG. 6.

As shown in FIG. 7, the bottoms 58 between the partition walls 30 formed on the partition wall sheet 2 by the forming device of FIG. 6 are linearly inclined upwardly in a direction from the opposite sides to the central portion of the sheet 2. Therefore, the electrode holding surfaces 56 according to the second embodiment almost completely prevent the printed electrodes 14 of the partition wall sheet 2 from being undesirably moved to the left or right during a partition wall forming process.

In the second embodiment of the present invention, it is preferable to set the inclination angle "β" of each inclined bottom 58 relative to a horizontal axis "X" parallel to the horizontal surface of the partition wall sheet 2 to 90° or less.

Figure 8:
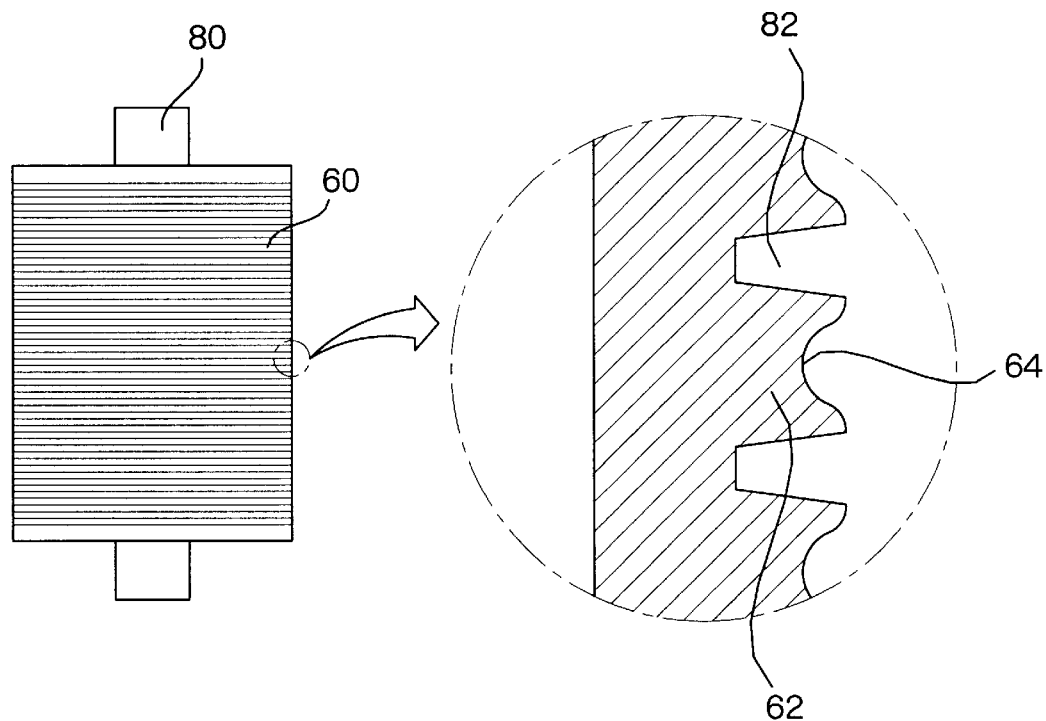
FIG. 8 is a view of a partition wall forming device in accordance with the third embodiment of the present invention.

FIG. 8 is a view of a partition wall forming device in accordance with the third embodiment of the present invention. In this third embodiment, the partition wall forming device includes a roll punch in place of the plate punches of the first and second embodiments.

In the third embodiment, the roll punch 60 is concentrically mounted to a rotating shaft 80, with a plurality of regularly spaced partition wall forming grooves 82 formed around the external surface of the roll punch 60. In the above roll punch 60, the lands 62, which are formed between the forming grooves 82 and are used for depressing the partition wall sheet 2, are longitudinally depressed at their external surfaces to individually have a rounded groove 64. When the roll punch 60 presses the partition wall sheet 2, the electrode holding grooves 64 of the lands 62 form a plurality of convex bottoms between the resulting partition walls 30 of the partition wall sheet 2 in the same manner as that described for the embodiment of FIG. 5. Therefore, the electrode holding grooves 64 almost completely prevent the printed electrodes 14 of the partition wall sheet 2 from being undesirably moved during a partition wall forming process.

Figure 9:
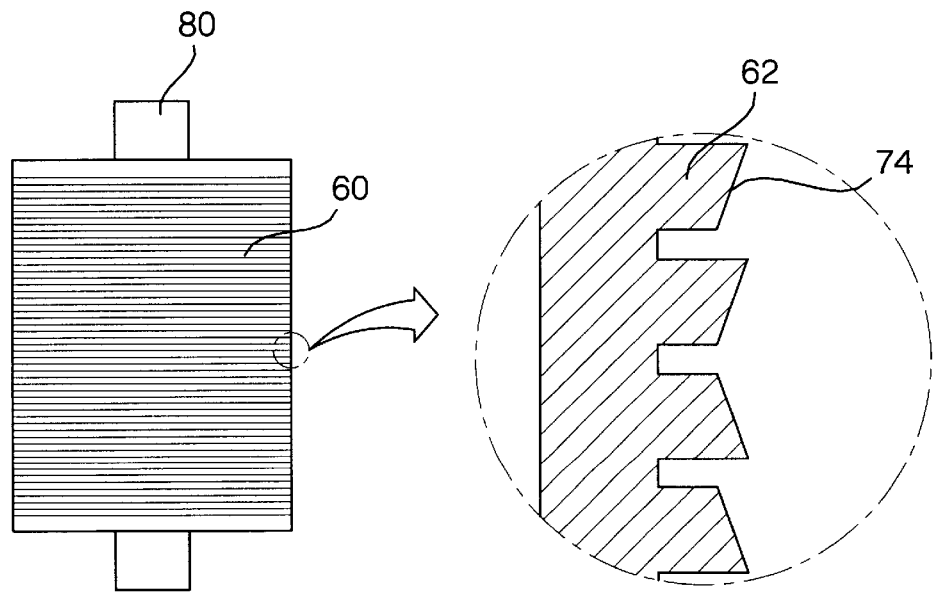
FIG. 9 is a view of a partition wall forming device in accordance with the fourth embodiment of the present invention.

FIG. 9 is a view of a partition wall forming device in accordance with the fourth embodiment of the present invention. The device of the fourth embodiment has another type of roll punch different from the roll punch of the third embodiment. That is, in the roll punch 60 of this fourth embodiment, an linearly inclined surface 74 is formed on the external surface of each land 62 to have a predetermined angle of inclination. The electrode holding surfaces 74 of the lands 62 are linearly inclined upwardly in a direction from the central portion to the opposite ends of the roll punch 60. Therefore, the electrode holding surfaces 74 of this embodiment almost completely prevent the printed electrodes 14 of the partition wall sheet 2 from being undesirably moved during a partition wall forming process in the same manner as that described for the embodiment of FIG. 7.

Figure 10:
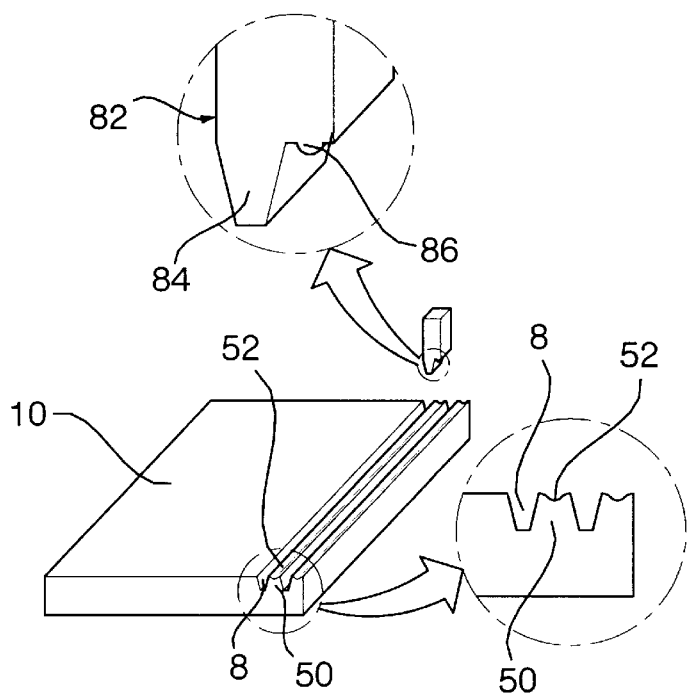
FIG. 10 is a view of an apparatus for producing a punch used for forming the partition walls on the base panel of a PDP in accordance with an embodiment of the present invention.

FIG. 10 is a view of an apparatus for producing a plate punch used for forming the partition walls on the base panel of a PDP in accordance with an embodiment of the present invention. As shown in the drawing, the plate punch producing apparatus forms desired partition wall forming grooves 8 on a plate punch 10 using a bite 82 having a tip 84 of the same shape as that of the desired forming grooves 8. In this embodiment, the bite 82 is also integrated with a convex cutter 86 at a proper position around the tip 84, thus forming desired electrode holding grooves 52 on the lands 50 of the plate punch 10 during a process of forming the partition wall forming grooves 8 on the plate punch 10.

That is, in an operation of the apparatus of this embodiment, the convex cutter 86 forms an electrode holding groove 52 along the top surface of a land 50 of the plate punch 10 when the bite 82 linearly moves on the punch 10 to form a partition wall forming groove 8 on the punch 10 by the tip 84.

Figure 11:
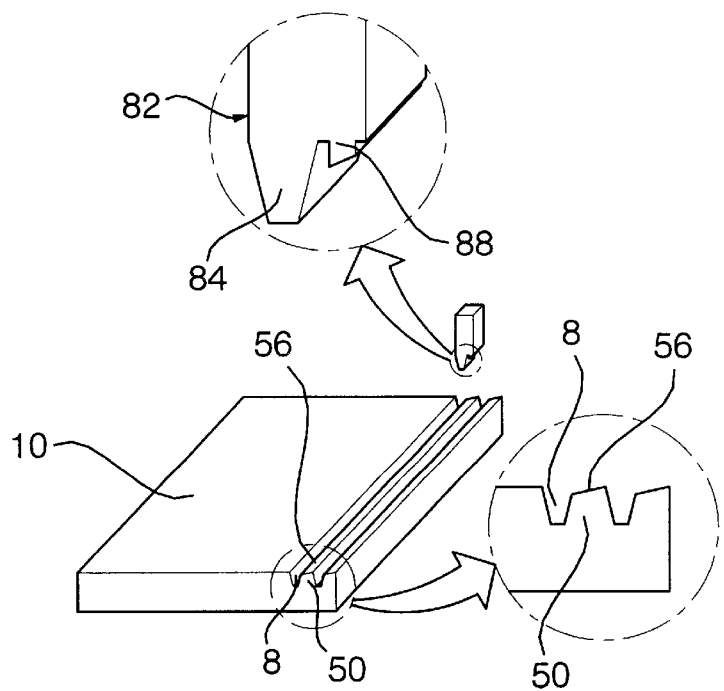
FIG. 11 is a view of an apparatus for producing a punch used for forming the partition walls on the base panel of a PDP in accordance with another embodiment of the present invention.

FIG. 11 is a view of an apparatus for producing a plate punch used for forming the partition walls on the base panel of a PDP in accordance with another embodiment of the present invention. In this embodiment, the bite 82 is integrated with an inclined cutter 88 at a proper position around the tip 84, thus forming desired electrode holding surfaces 56 on the lands 50 of the plate punch 10 during a process of forming the partition wall forming grooves 8 on the plate punch 10.

That is, in an operation of the apparatus of this embodiment, the inclined cutter 88 forms an inclined surface, used as an electrode holding surface 56, along the top surface of a land 50 of the plate punch 10 when the bite 82 linearly moves on the punch 10 to form a partition wall forming groove 8 on the punch 10 by the tip 84.

As described above, the present invention provides a device for forming the partition walls on the base panel of a PDP. The partition wall forming device of this invention is designed to prevent an undesired movement of the printed address electrodes of the base panel during a process of forming the partition walls on the base panel, thus finally allowing a precise arrangement of the partition walls with the address electrodes on the base panel.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for forming partition walls of a plasma display panel, comprising:

a lower plate used for seating a base panel of said plasma display panel thereon during a partition wall forming process, with a partition wall sheet of a predetermined thickness formed on said base panel and a plurality of electrodes arranged on said base panel;

a punch provided with a plurality of partition wall forming grooves having a shape corresponding to that of the partition walls to be formed on said base panel, with a plurality of lands formed between said partition wall forming grooves and used for pressing the partition wall sheet during said partition wall forming process, and electrode holding means formed on each of said lands and used for preventing said electrodes from being undesirably moved during said process; and an upper plate positioned above said punch so as to hold the punch and to move the punch in a vertical direction within a predetermined range.

2. The device according to claim 1, wherein said electrode holding means comprises an electrode holding groove concaved along a surface of each of said lands, the electrode holding grooves of the lands forming a plurality of convex bottoms between the partition walls of the base panel so as to prevent said electrodes of the partition wall sheet from being undesirably moved when the punch presses the partition wall sheet down to form said partition walls on the base panel.

3. The device according to claim 1, wherein said electrode holding means comprises an electrode holding inclined surface formed on a surface of each of said lands, the electrode holding inclined surfaces of the lands being linearly inclined upwardly in a direction from opposite sides to a central portion of said punch, and forming a plurality of inclined bottoms between the partition walls of the base panel so as to prevent said electrodes of the partition wall sheet from being undesirably moved when the punch presses the partition wall sheet down to form said partition walls on the base panel.

4. A device for forming partition walls of a plasma display panel by pressing a partition wall sheet of a predetermined thickness, formed on a base panel of the plasma display panel, using a punch, wherein the punch is a roll punch having a predetermined diameter with a rotating shaft mounted to a central axis of said roll punch, said roll punch also having a plurality of partition wall forming grooves, with a plurality of lands formed between said partition wall forming grooves and used for pressing the partition wall sheet during a partition wall forming process, and electrode holding means formed on each of said lands and used for holding printed electrodes of the partition wall sheet so as to prevent the electrodes from being undesirably moved during said partition wall forming process.

5. The device according to claim 4, wherein said electrode holding means comprises an electrode holding groove concaved along a surface of each of said lands, the electrode holding grooves of the lands forming a plurality of convex bottoms between the partition walls of the base panel so as to prevent said electrodes of the partition wall sheet from being undesirably moved when the punch presses the partition wall sheet down to form said partition walls on the base panel.

6. The device according to claim 4, wherein said electrode holding means comprises an electrode holding inclined surface formed on a surface of each of said lands, the electrode holding inclined surfaces of the lands being linearly inclined downwardly in a direction from opposite ends to a central portion of said roll punch, and forming a plurality of inclined bottoms between the partition walls of the base panel so as to prevent said electrodes of the partition wall sheet from being undesirably moved when the punch presses the partition wall sheet down to form said partition walls on the base panel.

7. A partition wall forming punch producing apparatus including a bite for forming both a plurality of partition wall forming grooves and a plurality of lands on a punch used for forming a plurality of partition walls on a base panel of a plasma display panel, wherein said bite has a tip used for forming said partition wall forming grooves on the punch, and is also provided with a convex cutter at a position around said tip for forming an electrode holding groove on each of said lands of the punch.

8. A partition wall forming punch producing apparatus including a bite for forming both a plurality of partition wall forming grooves and a plurality of lands on a punch used for forming a plurality of partition walls on a base panel of a plasma display panel, wherein said bite has a tip used for forming said partition wall forming grooves on the punch, and is also provided with an inclined cutter at a position around said tip for forming an electrode holding inclined surface on each of said lands of the punch.

9. A base panel for plasma display panels having both a plurality of partition walls and a plurality of electrodes, wherein a plurality of inclined bottoms are formed on a partition wall sheet of said base panel at positions above said electrodes between said partition walls, said inclined bottoms being linearly inclined upwardly in a direction from opposite sides to a central portion of the base panel.

* * * * *